United States Patent
Li et al.

(10) Patent No.: US 12,206,948 B2
(45) Date of Patent: Jan. 21, 2025

(54) METHOD FOR DISPLAYING LIVE STREAMING INTERFACE

(71) Applicant: Beijing Zitiao Network Technology Co., Ltd., Beijing (CN)

(72) Inventors: Hongfu Li, Beijing (CN); Sibo Li, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/392,812

(22) Filed: Dec. 21, 2023

(65) Prior Publication Data
US 2024/0163516 A1    May 16, 2024

Related U.S. Application Data

(63) Continuation of application No. PCT/CN2022/126651, filed on Oct. 21, 2022.

(30) Foreign Application Priority Data

Nov. 4, 2021    (CN) .......................... 202111302179.2

(51) Int. Cl.
*H04N 5/445*    (2011.01)
*G06F 3/00*    (2006.01)
(Continued)

(52) U.S. Cl.
CPC ....... *H04N 21/472* (2013.01); *H04N 21/2187* (2013.01); *H04N 21/4316* (2013.01); *H04N 21/4788* (2013.01)

(58) Field of Classification Search
CPC ............. H04N 21/472; H04N 21/2187; H04N 21/4316; H04N 21/4788
See application file for complete search history.

(56) References Cited

U.S. PATENT DOCUMENTS

2002/0059595 A1    5/2002   Goldschmidt Iki et al.
2014/0050400 A1*   2/2014   Park .......................... G06F 16/50
                                                     382/177
(Continued)

FOREIGN PATENT DOCUMENTS

CN        105245937 A  *   1/2016
CN        106487781 A       3/2017
(Continued)

OTHER PUBLICATIONS

Translation version of CN 105245937 A (Year: 2016).*
(Continued)

*Primary Examiner* — Gigi L Dubasky

(57) ABSTRACT

The disclosure provided live streaming interface display method, device, apparatus, storage medium and program product. The method comprises displaying a live streaming interface, wherein the live streaming interface comprises an identification area, the identification area comprises at least one scene identification, and each scene identification is used for indicating a live streaming scene; in response to a first input on a first scene identification of the at least one scene identification, displaying at least one first data source identification corresponding to the first scene identification in the identification area, wherein the first scene identification is used for indicating a first live streaming scene, and each first data source identification is used for indicating one data source in the first live streaming scene.

14 Claims, 7 Drawing Sheets

(51) Int. Cl.
*G06F 13/00* (2006.01)
*H04N 21/2187* (2011.01)
*H04N 21/431* (2011.01)
*H04N 21/472* (2011.01)
*H04N 21/4788* (2011.01)

(56) References Cited

U.S. PATENT DOCUMENTS

| | | | |
|---|---|---|---|
| 2014/0068672 A1 | 3/2014 | Goldschmidt et al. | |
| 2014/0130099 A1 | 5/2014 | Kunisetty | |
| 2018/0020243 A1* | 1/2018 | Ni | H04N 21/23418 |
| 2019/0200047 A1 | 6/2019 | Cui et al. | |
| 2021/0373751 A1* | 12/2021 | Sangoli | G06F 16/447 |
| 2023/0101302 A1* | 3/2023 | Chen | H04N 21/4316 725/38 |

FOREIGN PATENT DOCUMENTS

| | | | | |
|---|---|---|---|---|
| CN | 109445572 A | 3/2019 | | |
| CN | 110636324 A | 12/2019 | | |
| CN | 111866539 A | 10/2020 | | |
| CN | 113318442 A | 8/2021 | | |
| CN | 113518254 A | 10/2021 | | |
| CN | 113573117 A | * 10/2021 | ......... H04N 21/2187 |
| EP | 3825849 A1 | 5/2021 | | |
| KR | 20140023660 A | 2/2014 | | |

OTHER PUBLICATIONS

Translation version of CN 113573117 A (Year: 2021).*
International Search Report issued Jan. 11, 2023 in International Application No. PCT/CN2022/126651, with English translation (6 pages).
Written Opinion of Searching Authority issued Jan. 11, 2023 in International Application No. PCT/CN2022/126651, with English translation (9 pages).
Extended EP Search Report issued Sep. 30, 2024 in EP Appl. No. 22889126.3 (10 pages).
Notice of Reasons for Refusal for Japanese Application No. 2023-578877, mailed Nov. 19, 2024, 13 pages.

* cited by examiner

METHOD FOR DISPLAYING LIVE STREAMING INTERFACE

CROSS REFERENCE TO RELATED APPLICATION

This application is based on and claims the benefit of priority from the International Patent Application No. PCT/CN2022/126651 and the Chinese application No. 202111302179.2, filed on Nov. 4, 2021, the contents of both of which are hereby incorporated by reference in their entirety for all purposes.

TECHNICAL FIELD

The present disclosure relates to the field of software technologies, and in particular, to a live streaming interface display method, apparatus, device, storage medium, and program product.

BACKGROUND

With the popularization of terminal devices such as mobile phones and tablet computers and the continuous development of internet technologies, live streaming becomes a trend and is more and more popular with people.

In the related art, the scene and the data source of the live streaming software are controlled by complex operations such as switching the interface for many times.

SUMMARY

In one aspect of the embodiments of the present disclosure, a live streaming interface display method is provided, the method comprises: displaying a live streaming interface, wherein the live streaming interface comprises an identification area, the identification area comprises at least one scene identification, and each scene identification is used for indicating a live streaming scene; in response to a first input on a first scene identification of the at least one scene identification, displaying at least one first data source identification corresponding to the first scene identification in the identification area, wherein the first scene identification is used for indicating a first live streaming scene, and each first data source identification is used for indicating one data source in the first live streaming scene.

In some embodiments, the live streaming interface further comprises a live streaming window area, and after displaying the live streaming interface, the live streaming interface display method further comprises: in response to the first input, displaying the first live streaming scene in the live streaming window area; receiving a second input on a second scene identification of the at least one scene identification; in response to the second input, updating the first live streaming scene displayed by the live streaming window area to a second live streaming scene indicated by the second scene identification.

In some embodiments, the method further comprises: in response to the second input, switching the first scene identification from the selected state to an unselected state, and switching the second scene identification from the unselected state to the selected state.

In some embodiments, the first scene identification is in a selected state after the first input, and the method further comprises: in response to the second input, canceling display of the at least one first data source identification; and in the identification area, displaying at least one second data source identification corresponding to the second scene identification, wherein each second data source identification is used for indicating one data source in the second live streaming scene.

In some embodiments, the at least one scene identification is arranged in sequence in a preset order; and the method further comprises: in response to the first input, displaying the at least one scene identification respectively in different display areas by taking the first scene identification as a boundary, and the first scene identification and scene identifications arranged before the first scene identification are displayed in the same display area; in response to a second input, moving target identification from a current display area to another display area; wherein: if a second scene identification is arranged before the first scene identification, the target identification comprises the first scene identification and a scene identification arranged after the second scene identification and before the first scene identification; and if the second scene identification is arranged after the first scene identification, the target identification includes the second scene identification and a scene identification arranged after the first scene identification and arranged before the second scene identification.

In some embodiments, the identification area includes an added scene identification, and after displaying the live streaming interface, the method further comprises: receiving a third input on the adding scene identification; in response to the third input, displaying a third scene identification corresponding to a newly added live streaming scene in the identification area; and displaying the newly added live streaming scene in the live streaming window area.

In some embodiments, the method further comprises: receiving a fourth input in a case where a chat window is displayed on the live streaming interface; in response to the fourth input, if the fourth input is an operation on a streaming state identification in the chat window, displaying a current streaming state; if the fourth input is an operation on a window locking identification in the chat window, displaying the chat window in a locking state; and in a case where the chat window is suspended on the live streaming window area and is in the locked state, responding to an operation of the data source in the live streaming window area below the chat window.

In some embodiments, in a case where a display area required for the at least one scene identification is larger than the first area, the first area includes a scroll control, the first area being an area for displaying the scene identification in the identification area; the method further comprises: receiving a fifth input for controlling movement of the scroll control; in response to the fifth input, updating scene identification currently visible to an user in the first region as the scroll control moves.

In some embodiments, after displaying the at least one first data source identification corresponding to the first scene identification in the identification area, the method further comprises: receiving a sixth input for adding a data source identification; in response to the sixth input, displaying a third data source identification corresponding to a newly added third data source in a second area of the identification area, wherein the second area is used for displaying a data source identification corresponding to the first scene identification; and displaying the third data source in the first live streaming scene.

In some embodiments, the in response to the sixth input, displaying a third data source identification corresponding to a newly added third data source in a second area of the identification area comprises: in response to the sixth input, displaying a first list, wherein the first list includes at least one data source type identification, and each data source type identification is used to indicate a type of a data source; in response to an input on a first data source type identification in the at least one data source type identification, displaying a third data source identification in a second area; and the third data source is the data source of the type indicated by the first data source type identification.

In some embodiments, after displaying the at least one first data source identification corresponding to the first scene identification in the identification area, the method further comprises: receiving a seventh input on a fourth data source identification of the at least one first data source identification; in response to the seventh input, performing a target operation, the target operation comprising any one of: operating the fourth data source, renaming the fourth data source, modifying a context of the fourth data source, locking the fourth data source, unlocking the fourth data source, deleting the fourth data source, moving the fourth data source identification one position forward, moving the fourth data source identification to the front, moving the fourth data source identification one position backward, and moving the fourth data source identification to the end.

In some embodiments, the in response to the seventh input, performing a target operation comprises: displaying a second list, wherein the second list includes at least one operation identification, and each operation identification is used to indicate an operation; in response to an input on a target operation identification in the at least one operation identification, performing the target operation; wherein the target operation identification is used for indicating the target operation.

In some embodiments, the identification area further comprises a first identification, the first identification is used for indicating a first screen mode, the first screen mode is a horizontal screen display mode or a vertical screen display mode, and the first screen mode is a current display mode of the live streaming interface; after displaying the live streaming interface, the method further comprises: receiving an eighth input on the first identification; in response to the eighth input, updating the first identification to a second identification, and switching the display mode of the live streaming interface from the first screen mode to a second screen mode; the second identification is used for indicating the second screen mode, the second screen mode is the horizontal screen display mode or the vertical screen display mode, and the second screen mode is different from the first screen mode.

In another aspect of the embodiments of the present disclosure, a live streaming interface display device is provided, the live streaming interface display device comprises: a display module configured to display a live streaming interface, the live streaming interface comprises an identification area, the identification area comprises at least one scene identification, and each scene identification is used for indicating a live streaming scene, the display module is further configured to in response to a first input on a first scene identification of the at least one scene identification, display at least one first data source identification corresponding to the first scene identification in the identification area, wherein the first scene identification is configured to indicate a first live streaming scene, and each first data source identification is used for indicating one data source in the first live streaming scene.

In some embodiments, the live streaming interface further comprises a live streaming window area, and the device also includes: a receiving module; the display module is further configured to, after displaying the live streaming interface, in response to the first input, display the first live streaming scene in the live streaming window area; the receiving module is configured to receive a second input on a second scene identification of the at least one scene identification; the display module is configured to in response to the second input, update the first live streaming scene displayed by the live streaming window area to a second live streaming scene indicated by the second scene identification.

In some embodiments, the first scene identification is in a selected state after the first input; the device also includes: a switching module; the switching module is configured to in response to the second input, switch the first scene identification from the selected state to an unselected state, and switch the second scene identification from the unselected state to the selected state.

In some embodiments, the first scene identification is in a selected state after the first input; the display module is further configured to in response to the second input, cancel display of the at least one first data source identification; and in the identification area, display at least one second data source identification corresponding to the second scene identification, wherein each second data source identification is used for indicating one data source in the second live streaming scene.

In some embodiments, the at least one scene identification is arranged in sequence in a preset order; and the display module is further configured to in response to the first input, display the at least one scene identification respectively in different display areas by taking the first scene identification as a boundary, and the first scene identification and scene identifications arranged before the first scene identification are displayed in the same display area; the device also includes: a moving module; the moving module is configured to in response to a second input, move target identification from a current display area to another display area; wherein: if a second scene identification is arranged before the first scene identification, the target identification comprises the first scene identification and a scene identification arranged after the second scene identification and before the first scene identification; and if the second scene identification is arranged after the first scene identification, the target identification includes the second scene identification and a scene identification arranged after the first scene identification and arranged before the second scene identification.

In some embodiments, the identification area includes an added scene identification, and the device also includes: a receiving module, the receiving module is configured to after the display module displays the live streaming interface, receive a third input on the adding scene identification; the display module is further configured to in response to the third input received by the receiving module, display a third scene identification corresponding to a newly added live streaming scene in the identification area; and display the newly added live streaming scene in the live streaming window area.

In some embodiments, the apparatus further comprises: a receiving module, the receiving module is configured to receive a fourth input in a case where a chat window is displayed on the live streaming interface by the display module; the display module is further configured to in response to the fourth input received by the receiving module, if the fourth input is an operation on a streaming state identification in the chat window, display a current streaming state; if the fourth input is an operation on a window locking identification in the chat window, display the chat window in a locking state; and in a case where the chat window is suspended on the live streaming window area and is in the locked state, respond to an operation of the data source in the live streaming window area below the chat window.

In some embodiments, in a case where a display area required for the at least one scene identification is larger than the first area, the first area includes a scroll control, the first area being an area for displaying the scene identification in the identification area; the device also includes: a receiving module; the receiving module is configured to receive a fifth input for controlling movement of the scroll control; the display module is further configured to in response to the fifth input received by the receiving module, update scene identification currently visible to an user in the first region as the scroll control moves.

In some embodiments, the apparatus further comprises: a receiving module; the receiving module is configured to after the display module displays the at least one first data source identification corresponding to the first scene identification in the identification area, receive a sixth input for adding a data source identification; the display module is further configured to in response to the sixth input received by the receiving module, display a third data source identification corresponding to a newly added third data source in a second area of the identification area, wherein the second area is configured to display a data source identification corresponding to the first scene identification; and display the third data source in the first live streaming scene.

In some embodiments, the display module is specifically configured to in response to the sixth input, display a first list, wherein the first list includes at least one data source type identification, and each data source type identification is used to indicate a type of a data source; in response to an input on a first data source type identification in the at least one data source type identification, display a third data source identification in a second area; and the third data source is the data source of the type indicated by the first data source type identification.

In some embodiments, the device further comprises a receiving module and an executing module; the receiving module is configured to after the display module displays the at least one first data source identification corresponding to the first scene identification in the identification area, receive a seventh input on a fourth data source identification of the at least one first data source identification; the execution module is configured to in response to the seventh input received by the receiving module, perform a target operation, the target operation comprising any one of: operating the fourth data source, renaming the fourth data source, modifying a context of the fourth data source, locking the fourth data source, unlocking the fourth data source, deleting the fourth data source, moving the fourth data source identification one position forward, moving the fourth data source identification to the front, moving the fourth data source identification one position backward, and moving the fourth data source identification to the end.

In some embodiments, the execution module is specifically configured to display a second list, wherein the second list includes at least one operation identification, and each operation identification is used for indicating an operation; in response to an input on a target operation identification in the at least one operation identification, perform the target operation; wherein the target operation identification is used for indicating the target operation.

In some embodiments, the identification area further comprises a first identification, the first identification is used for indicating a first screen mode, the first screen mode is a horizontal screen display mode or a vertical screen display mode, and the first screen mode is a current display mode of the live streaming interface; the device also includes: a receiving module; the receiving module is configured to, after the display module displays the live streaming interface, receive an eighth input on the first identification; the display module is further configured to in response to the eighth input received by the receiving module, update the first identification to a second identification, and switch the display mode of the live streaming interface from the first screen mode to a second screen mode; the second identification is configured to indicate the second screen mode, the second screen mode is the horizontal screen display mode or the vertical screen display mode, and the second screen mode is different from the first screen mode.

In another aspect of the embodiments of the present disclosure, an electronic apparatus is provided, the electronic apparatus comprises: a memory and a processor; the memory is used for storing a computer program and when the computer program is invoked, the processor is used for executing the steps of the live streaming interface display method as disclosed in the first aspect.

In another aspect of the embodiments of the present disclosure, a non-transitory computer-readable storage medium is provided, the non-transitory computer-readable storage medium has stored thereon a computer program which, when executed by a processor, perform the steps of the live streaming interface display method as disclosed in the first aspect.

In another aspect of the embodiments of the present disclosure, a computer program product is provided, the computer program product comprises: a computer-readable storage medium having stored thereon a computer program which, when executed by a processor, performs the live streaming interface display method as disclosed in the first aspect.

In another aspect of the embodiments of the present disclosure, a chip is provided, and the chip comprises a processor and a communication interface, the communication interface is coupled to the processor, and the processor is used to execute program instructions to perform the live streaming interface display method as described in the first aspect.

In another aspect of the embodiments of the present disclosure, a computer program is provided, and the computer program comprises instructions that when executed by a processor cause the processor to perform the live streaming interface display method as disclosed in the first aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

In order to more clearly illustrate the embodiments or technical solutions in the related art of the present disclosure, the drawings used in the embodiments or technical solutions in the related art description will be briefly described below, and it is obvious for those skilled in the art that other drawings can be obtained according to these drawings without inventive labor.

DETAILED DESCRIPTION

Figure 1:
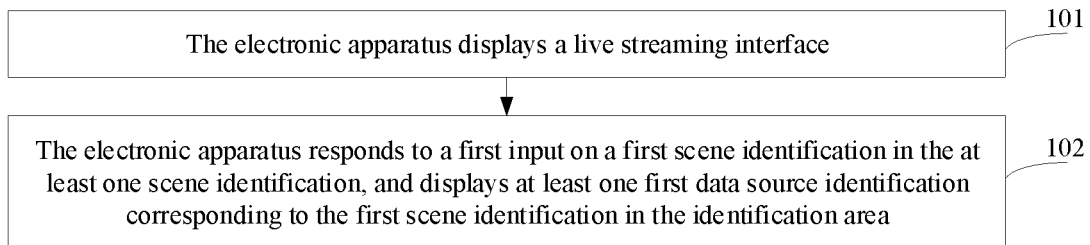
FIG. 1 is a schematic flowchart of a live streaming interface display method according to an embodiment of the present disclosure.

In order that the above objects, features and advantages of the present disclosure can be more clearly understood, aspects of the present disclosure will be further described below. It should be noted that, in the case of no conflict, the embodiments and features in the embodiments of the present disclosure can be combined with each other.

In the following description, numerous specific details are set forth in order to provide a thorough understanding of the present disclosure, but the present disclosure can be practiced otherwise than as described herein; it is to be understood that the embodiments disclosed in the specification are only a few embodiments of the present disclosure, and not all embodiments.

The terms "first", "second" and the like in the description and in the claims of the present disclosure are used for distinguishing between similar elements and not necessarily for describing a particular sequential or chronological order. It will be appreciated that the data used can be interchanged under appropriate circumstances such that embodiments of the disclosure can be practiced other than those illustrated or described herein, and that the words "first", "second", etc. are generally relates to one category, and do not necessarily limit the number of objects, e.g., the first object can be one, or can be multiple. In addition, "and/or" in the specification and claims means at least one of the connected objects, and the character "/" generally means that the former and latter related objects are in an "or" relationship.

The electronic apparatus in the embodiments of the present disclosure can be a mobile electronic apparatus, and can also be a non-mobile electronic apparatus. The mobile electronic apparatus can be a mobile phone, a tablet computer, a notebook computer, a palmtop computer, a vehicle-mounted electronic apparatus, a wearable device, an ultra-mobile personal computer (UMPC), a netbook or a Personal Digital Assistant (PDA) and so forth; the non-mobile electronic apparatus can be a Personal Computer (PC), a Television (TV), a teller machine or a self-service machine and so forth; the disclosed embodiments are not particularly limited.

As described above, in the related art, the scene and the data source of the live streaming software are controlled by complex operations such as switching the interface for multiple times, and the display mode of the scene and the data source is poor in hierarchical sensation and difficult to edit. Therefore, the operation efficiency can be low, and the user experience can be affected.

In order to solve the problems that the operation efficiency of existing live streaming software is low and user experience is affected, the present disclosure provides a live streaming interface display method, device, apparatus, storage medium and program product.

An execution main body of the live streaming interface display method provided in the embodiment of the present disclosure can be the electronic apparatus (including a mobile electronic apparatus and a non-mobile electronic apparatus), or can also be a functional module and/or a functional entity capable of implementing the live streaming interface display method in the electronic apparatus, which can be specifically determined according to actual use requirements, and the embodiment of the present disclosure is not limited.

The live streaming interface display method provided by the embodiment of the present disclosure is described in detail below with reference to the accompanying drawings by using specific embodiments and application scenarios thereof.

As shown in FIG. 1, a live streaming interface display method provided in the embodiment of the present disclosure is exemplarily described below with an execution subject as an electronic apparatus as an example. The method can include steps 101 to 102 described below.

101. The electronic apparatus displays a live streaming interface.

The live streaming interface comprises an identification area, the identification area comprises at least one scene identification, and each scene identification is used for indicating a live streaming scene.

It can be understood that different scene identifications are used for indicating different live streaming scenes, the identification area comprises one scene identification or a plurality of scene identifications, and when the identification area comprises a plurality of scene identifications, a user can determine how many live streaming scenes exist currently according to the number of the scene identifications in the identification area, so that the user can control each live streaming scene conveniently.

102. The electronic apparatus in response to a first input on a first scene identification of the at least one scene identification, displays at least one first data source identification corresponding to the first scene identification in the identification area.

The first scene identification is used for indicating a first live streaming scene, and each first data source identification is used for indicating one data source in the first live streaming scene.

In some embodiments, the first input can be a click input of the user on the first scene identification, a slide input of the user on the first scene identification, or other feasibility inputs, which is not limited in the embodiments of the present disclosure.

For example, the click input can be click input of any number of times, such as single click input, double click input, triple click input, and the like, or can also be click input of any duration, such as short press input, long press input, and the like, and the embodiment of the present disclosure is not limited. The slide input can be a slide input in any direction, such as an upward slide input, a downward slide input, a leftward slide input, a rightward slide input, a clockwise slide input, and a counterclockwise slide input, or can be a multi-finger slide input, such as a two-finger slide input and a three-finger slide input, which is not limited in the embodiment of the present disclosure.

In an embodiment of the present disclosure, the data source indicated by the at least one first data source identification forms a first live scene. The data sources added in the live streaming scene are data sources required by live streaming, and the number of the data sources can be set according to the requirement. The added data source can be a data source of external video data input from outside, such as a data source of an external device like a Universal Serial Bus (USB) camera, a video camera, a digital camera and so forth, or an internal application program picture, such as an internal data source such as office software, an audio/video player, a game program, a browser, a design software and so forth, or a continuous computer screen shot, including a full screen, a window screen and a region screen, a static picture and a dynamic picture format and a text, and so forth.

In the embodiment of the disclosure, in response to a first input on a first scene identification, an electronic apparatus selects the first scene identification, displays a first live streaming scene indicated by the first scene identification in a live streaming window area, and displays, in an identification area, at least one first data source identification corresponding to the first scene identification. That is to say, the electronic apparatus can simultaneously display the multiple scene identifications and the data source identifications corresponding to the selected scene identifications in the identification area, so that the relationship between the scene and the data source is well shown, the hierarchical impression between the scene and the data source is improved, the interface does not need to be switched, the operation on the scene identifications and the data source identifications can be facilitated, the operation efficiency can be improved, and the human-computer interaction performance can be improved.

In some embodiments, the live streaming interface further comprises a live streaming window area, and after the step 101, the live streaming interface display method provided by the embodiment of the present disclosure can further include the following steps 103 to 105.

103. The electronic apparatus displays a first live streaming scene indicated by the first scene identification in the live streaming window area in response to the first input.

Wherein the live streaming window area is used for displaying the live streaming scene. The live view window area is an area where streaming media (streaming view) is displayed.

104. The electronic apparatus receives a second input on a second scene identification of the at least one scene identification.

105. The electronic apparatus, in response to the second input, updates the first live streaming scene displayed by the live streaming window area to a second live streaming scene indicated by the second scene identification.

In some embodiments, the second input can be a click input of the user on the second scene identification, a slide input of the user on the second scene identification, or other feasibility inputs, which is not limited in the embodiment of the present disclosure.

For example, the description of the click input and the slide input can refer to the description of the click input and the slide input in the description of the first input in step 102, and will not be described herein again.

In the embodiment of the disclosure, when the user selects other scene identifications in the identification area, the electronic apparatus can switch the live streaming scene currently displayed in the live streaming window area, the operation is simple and can be conveniently remembered by the user, and the operation efficiency can be improved.

In some embodiments, the first scene identification is in a selected state after the first input. The second scene identification can be selected (i.e., the second identification switches from an unselected state to a selected state) in response to the second input, and at least one second data source identification corresponding to the second identification can be displayed.

In some embodiments, the first scene identification is in a selected state after the first input. The second scene identification can be selected (i.e., the second identification is switched from the unselected state to the selected state) in response to the second input, while the first identification is switched from the selected state to the unselected state; and at least one second data source identification corresponding to the second identification is displayed, and display of at least one first data source identification is simultaneously canceled.

For example, after the step 104, the live streaming interface display method provided by the embodiment of the present disclosure can further include the step 106 described below.

106. The electronic apparatus, in response to a second input, switches the first scene identification from the selected state to the unselected state, and switches the second scene identification from the unselected state to the selected state.

It can be understood that in response to the second input of the user on the second scene identification, the scene identification in the selected state is switched from the first scene identification to the second scene identification, that is, there is only one scene identification in the selected state in the live streaming interface, and the live streaming scene indicated by the scene identification in the selected state is displayed in the live streaming window area.

In the embodiment of the disclosure, only one scene identification is in the selected state, so that a user can determine which scene identification corresponds to the live streaming scene displayed in the current live streaming window area according to whether the scene identification is in the selected state, thereby facilitating the user operation and improving the operation efficiency.

For example, after the step 104, the live streaming interface display method provided by the embodiment of the present disclosure can further include the following step 107.

107. The electronic apparatus, in response to a second input, cancels the display of the at least one first data source identification, and displays at least one second data source identification corresponding to a second scene identification in the identification area.

Wherein each second data source identification is indicative of one data source in the second live streaming scene.

Compared with the related art, the technical scheme provided by the embodiment of the disclosure has the following advantages:

in the embodiment of the disclosure, in response to a first input on a first scene identification in at least one scene identification, at least one first data source identification corresponding to the first scene identification (the first scene identification is used for indicating a first live streaming scene, and each first data source identification is used for indicating one data source in the first live streaming scene) is displayed in the identification area. In the present solution, at least one scene identification and the data source identification corresponding to the selected scene identification are simultaneously displayed in the identification area in the live streaming interface, the relationship between the scene and the data source is well shown, the hierarchical sensation between the scene and the data source is improved, and the interface does not need to be switched, so that the input on the scene identification by a user can be facilitated, the input of the user on the data source identification can also be facilitated, the control of the user on the scene and the data source is facilitated, and the operation efficiency is improved.

Figure 2:
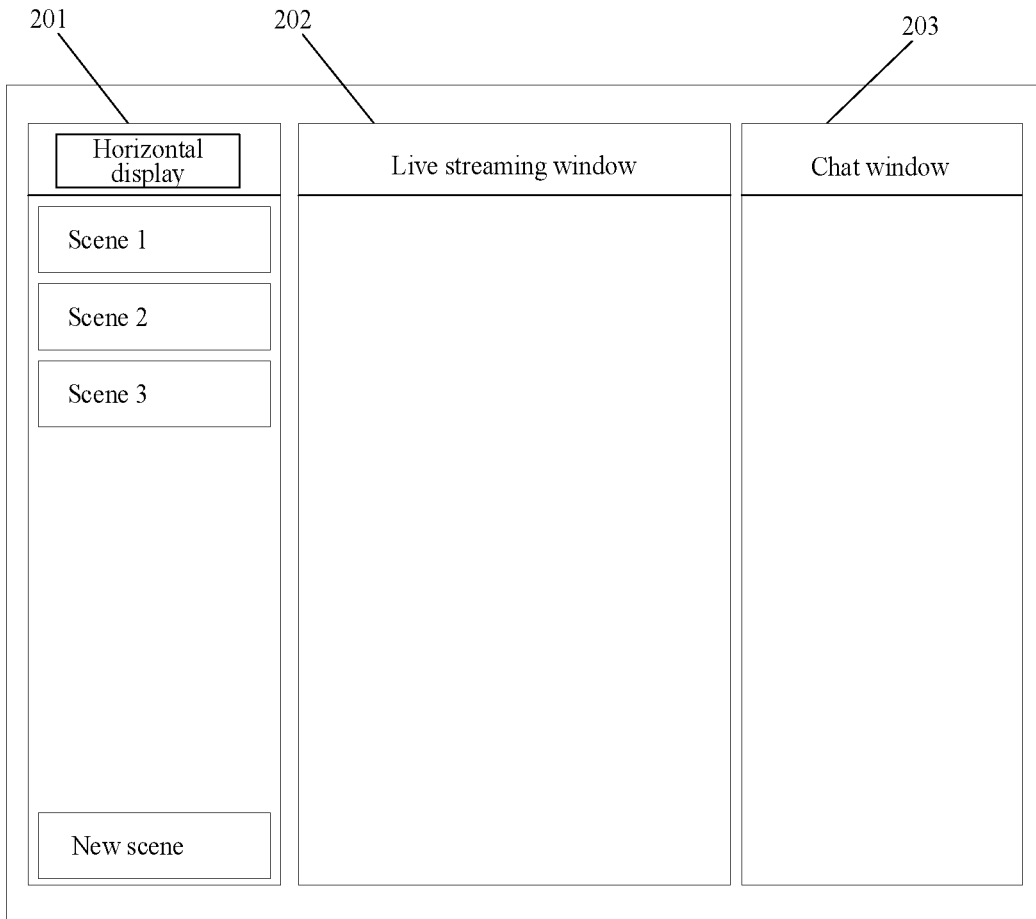
FIG. 2 is a first schematic interface diagram of a live streaming interface display method provided in the embodiment of the present disclosure.
Figure 3:
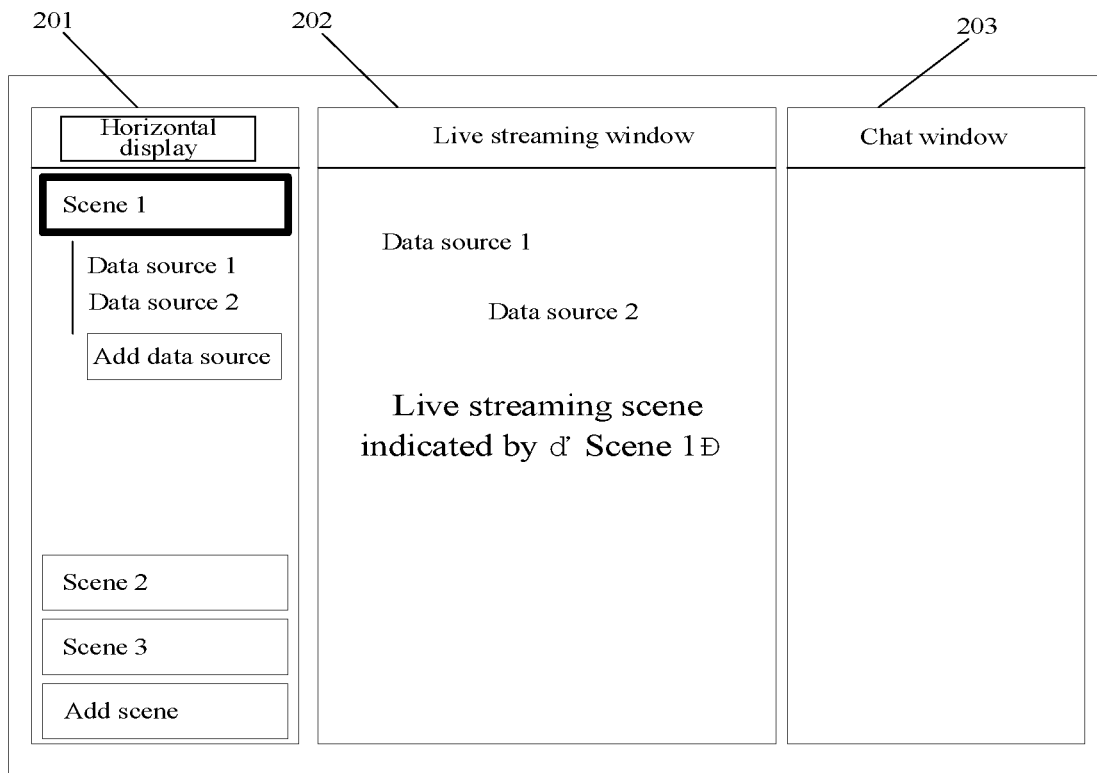
FIG. 3 is a second schematic interface diagram of a live streaming interface display method according to an embodiment of the present disclosure.

For example, as shown in FIG. 2, a label "201" indicates an identification area, a label "202" indicates a live streaming window area (which can also be a streaming media area), and a label "203" indicates a chat window area. When the live streaming window area starts playing the streaming media, the chat window area displays corresponding content, and when the live streaming window area does not start playing the streaming media, the chat window area displays nothing, and can also display a prompt message, for example, "It would be shown when you start streaming", which is not limited by the embodiment of the present disclosure. As shown in FIGS. 2, three scene identifications of "Scene 1", "Scene 2", and "Scene 3" are currently displayed in the identification area. As shown in FIG. 3, when the user clicks "Scene 1", the electronic apparatus displays a live streaming scene indicated by "Scene 1" in the live streaming window area, a frame of "Scene 1" is bold to indicate that it is currently in a selected state, and two data source identifications "Data source 1" and "Data source 2" corresponding to "Scene 1" are displayed below "Scene 1" in the identification area.

Figure 4:
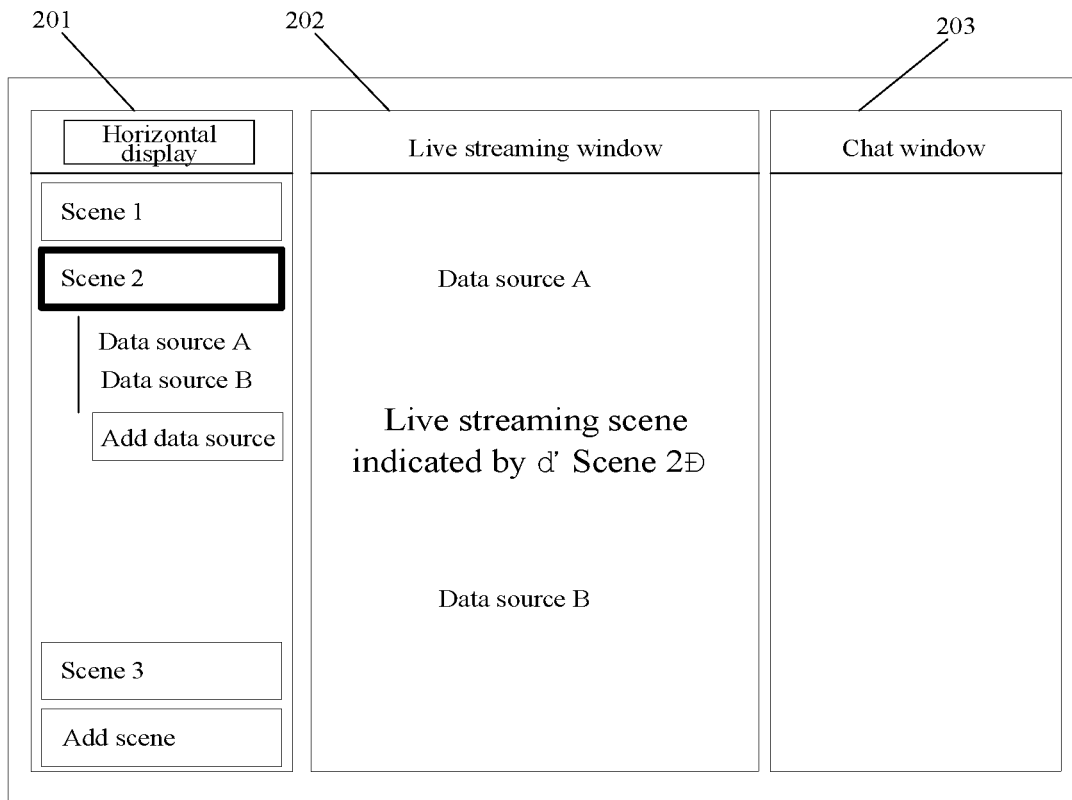
FIG. 4 is a third schematic interface diagram of a live streaming interface display method according to the present disclosure.

For example, as shown in FIG. 4, when the user clicks "Scene 2", the electronic apparatus updates the live streaming scene indicated by "Scene 1" to the live streaming scene indicated by "Scene 2", switches "Scene 1" from the selected state to the unselected state, and switches "Scene 2" from the unselected state to the selected state. Moreover, the electronic apparatus cancels display of the "Data source 1" and the "Data source 2" corresponding to the "Scene 1", and displays the "Data source A" and the "Data source B" corresponding to the "Scene 2".

In the embodiment of the disclosure, when the live streaming scene is switched, the data source identification corresponding to the scene identification is switched simultaneously, so that the incorrect operation of the user is avoided, and the operation efficiency can be improved.

In some embodiments, the at least one scene identification is arranged in sequence in a preset order; the preset sequence can be determined according to the generation time of the scene identification, can also be determined according to a user requirement (that is, the user can adjust the arrangement sequence of the scene identifications according to a use requirement), and can also be another feasible sequence, which is not limited in the embodiment of the present disclosure.

In some embodiments, after the step 101, the live streaming interface display method provided by the embodiment of the present disclosure can further include the following step 108, and after the step 104, the live streaming interface display method provided by the embodiment of the present disclosure can further include the following step 109.

108. The electronic apparatus, in response to the first input, uses the first scene identification as a boundary, and the at least one scene identification is respectively displayed in different display areas.

Wherein the first scene identification and the scene identification arranged before the first scene identification are displayed in the same display area.

It is to be understood that, in response to the first input, the first scene identification and the scene identification arranged before the first scene identification are displayed in one display area (hereinafter, referred to as area 1) of the identification area, and the scene identification after the first scene identification is displayed in the other display area (hereinafter, referred to as area 2) of the identification area.

It should be noted that: there is no distinct boundary between area 1 and area 2, and area 1 and area 2 vary with the number of scene identifications displayed therein. In the embodiment of the present disclosure, the first scene identification is used to demarcate the boundary only for qualitative differentiation, and the at least one scene identification is displayed in areas without limiting the size of area 1 and area 2.

109. The electronic apparatus, in response to a second input, moves the target identification from the current display area to another display area.

It can be understood that, in the case of switching the scene identification in the selected state from the first scene identification to the second scene identification, the scene identifications arranged before the first scene identification and the second scene identification are moved, and at the same time, the first scene identification or the second scene identification also needs to be moved, so that the second scene identification, and the scene identifications arranged before the second scene identification are displayed in the area 1, and the scene identifications arranged after the second scene identification are displayed in the area 2.

Wherein, in response to the second input, the specific process of moving the scene identification is: if the second scene identification is arranged before the first scene identification, the target identification includes the scene identification arranged after the second scene identification and before the first scene identification and the first scene identification; if the second scene identification is arranged after the first scene identification, the target identification includes a scene identification arranged after the first scene identification and before the second scene identification, and a second scene identification.

It can be understood that, two areas in the identification area display the scene identification, when one scene identification located in the upper area (area 1) is selected, the scene identification below the scene identification is pushed to the lower area (area 2) to be displayed; when one scene identification in the lower area is selected, the scene identification above the scene identification and the scene identification are pushed up to the upper area, and the whole movement effect is similar to the movement effect of an accordion.

In the embodiment of the disclosure, the currently selected scene identification (in the selected state) is taken as a boundary, the at least one scene identification is separately displayed, so that a user can feel more intuitively, the user can distinguish the selected scene identification from unselected scene identifications more conveniently, and the user can determine which scene identification corresponds to the currently displayed live streaming scene in the current live streaming window area conveniently. Moreover, the scene identification in the selected state is displayed at the last position of the previous area, the corresponding data source is displayed below the scene identification in the selected state, and the scene identifications arranged after the scene identification in the selected state are displayed at a certain distance (greater than a preset distance) separately (in the next area). Thereby, incorrect operation of the user can be prevented and the operating efficiency of the user is improved.

In some embodiments, the identification area includes an adding scene identification and after the step 101, the live streaming interface display method provided by the embodiment of the present disclosure can further include the following steps 110 to 111.

110. The electronic apparatus receives a third input on the adding scene identification.

In some embodiments, the third input can be a click input for adding the scene identification, a slide input for adding the scene identification, or other feasibility inputs for adding the scene identification, which is not limited in the embodiments of the present disclosure.

For example, the detailed description of the click input and the slide input can refer to the related description of the click input and the slide input in the description of the first input in step 102, and will not be described herein again.

111. The electronic apparatus, in response to a third input, displays a third scene identification corresponding to the newly added live streaming scene in the identification area; and displaying the newly added live streaming scene in the live streaming window area.

It can be understood that, through a third input on the adding scene identification, the electronic apparatus is triggered to add a new live streaming scene, and a third scene identification corresponding to the newly added live streaming scene is displayed in the identification area, and the newly added live streaming scene is displayed in the live streaming window area.

Figure 5:
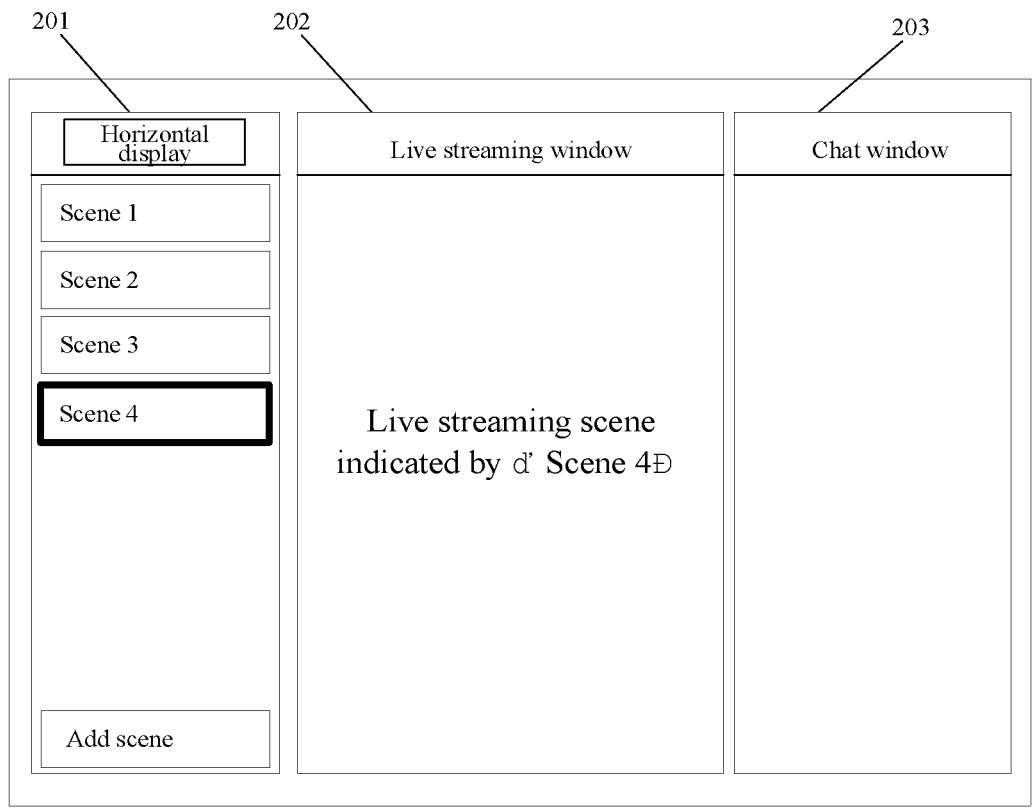
FIG. 5 is a fourth schematic interface diagram of a live streaming interface display method according to an embodiment of the present disclosure.

For example, as shown in FIG. 5, the user clicks the add scene identification, and the electronic apparatus displays the newly added "Scene 4" in the identification area, and displays the live streaming scene indicated by "Scene 4" in the live streaming window area.

In the embodiment of the disclosure, the added scene identification is displayed in the identification area, the operation is simple and convenient, a new live streaming scene can be added quickly, the user does not need to operate for many times, the new live streaming scene can be added, and the operation efficiency can be improved.

In some embodiments, the identification area further includes a first identification, the first identification is used for indicating a first screen mode, the first screen mode is a horizontal screen display mode or a vertical screen display mode, and the first screen mode is a current display mode of the live streaming interface, and after the step 101, the live streaming interface display method provided by the embodiment of the present disclosure can further include the following steps 112 to 113.

112. The electronic apparatus receives an eighth input on the first identification.

In some embodiments, the eighth input can be a click input on the first identification, a slide input on the first identification, or other feasibility inputs to the first identification, which is not limited in the embodiments of the present disclosure.

For example, the detailed description of the click input and the slide input can refer to the related description of the click input and the slide input in the description of the first input in step 102, and will not be described herein again.

113. The electronic apparatus, in response to an eighth input, updates the first identification into a second identification, and switches the display mode of the live streaming interface from the first screen mode to the second screen mode.

The second identification is used for indicating a second screen mode, the second screen mode is a horizontal screen display mode or a vertical screen display mode, and the second screen mode is different from the first screen mode.

It can be understood that the first identification and the second identification are horizontal screen identification and vertical screen identification, and if the first identification is a horizontal screen identification indicating a horizontal screen display mode, the second identification is a vertical screen identification indicating a vertical screen display mode; and if the first identification is a vertical screen identification indicating a vertical screen display mode, the second identification is a horizontal screen identification indicating a horizontal screen display mode.

Figure 6:
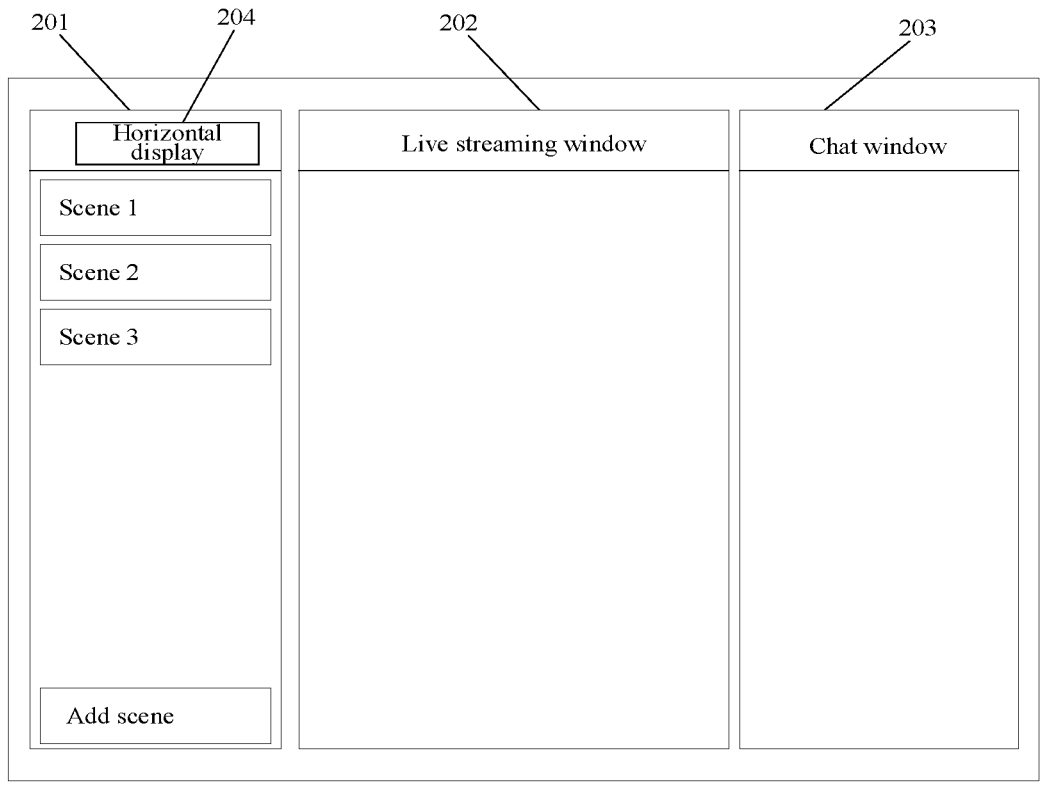
FIG. 6 is a fifth schematic interface diagram of a live streaming interface display method according to the embodiment of the present disclosure.
Figure 7:
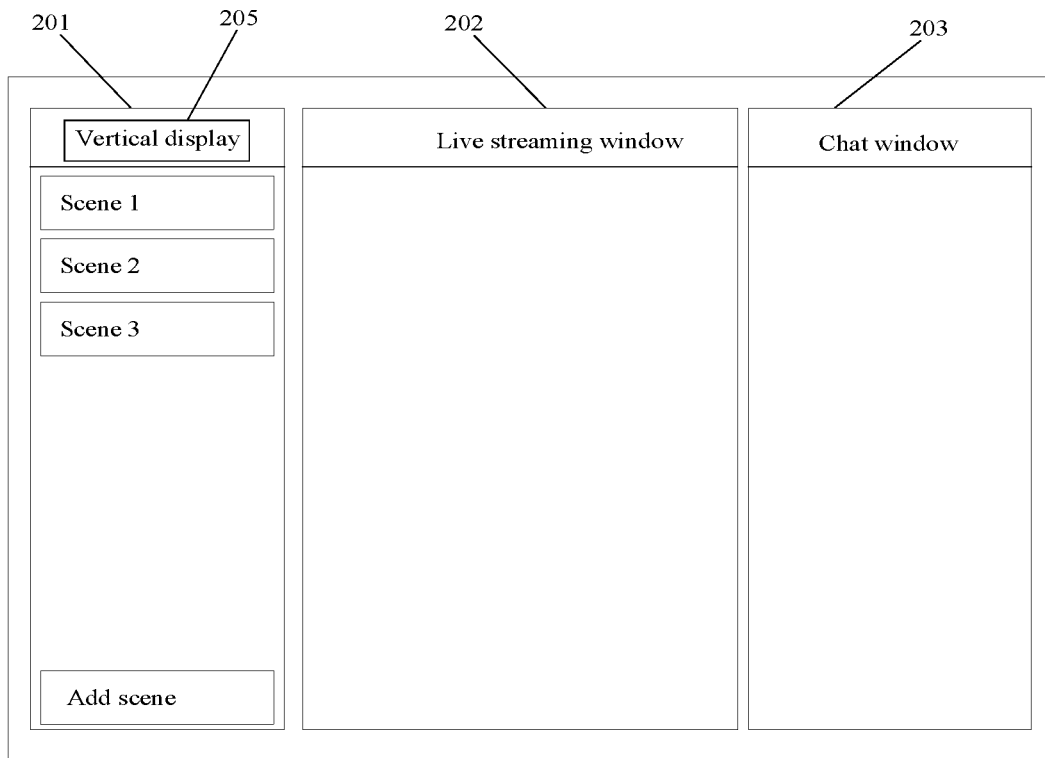
FIG. 7 is a sixth schematic interface diagram of a live streaming interface display method according to an embodiment of the present disclosure.
Figure 8:
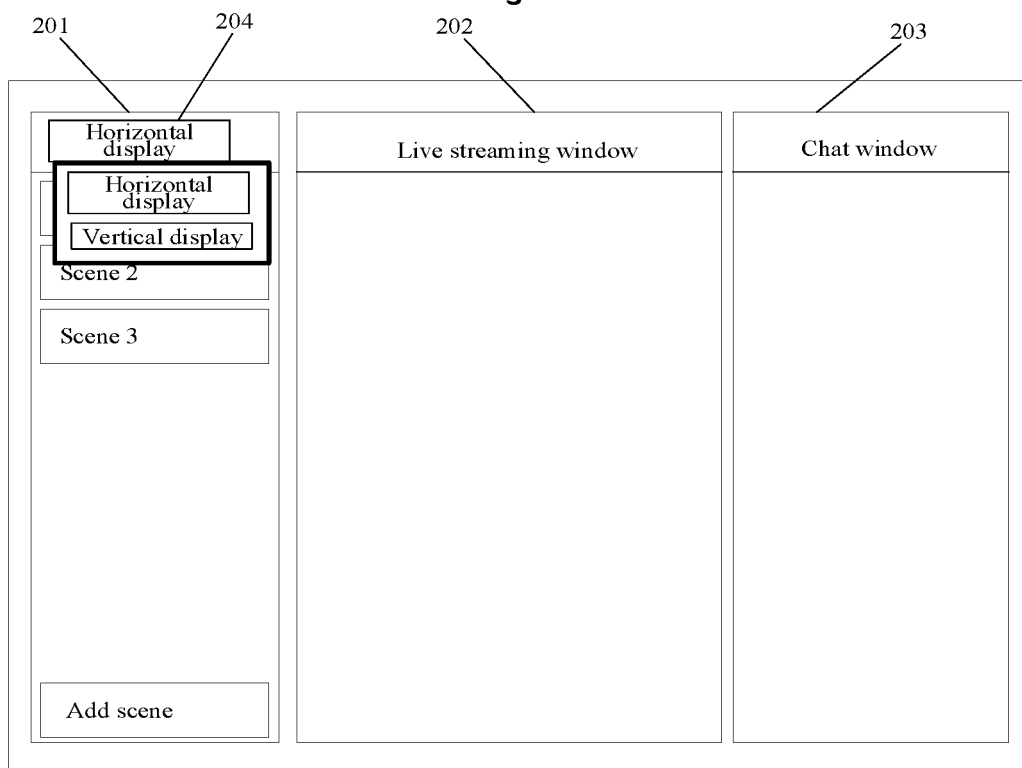
FIG. 8 is a seventh schematic interface diagram of a live streaming interface display method according to an embodiment of the present disclosure.

For example, the first identification is a horizontal screen identification, as shown in FIG. 6, the label "204" indicates a "horizontal screen identification", and the eighth input can be an operation of clicking the "horizontal screen identification", As shown in FIG. 7. In response to the eighth input, the horizontal screen identification is updated to a vertical screen identification indicated by the label "205" and the display mode of the live streaming interface is switched from the horizontal screen mode to the vertical screen mode, so that the operation is simple and convenient. As shown in FIG. 8, the indication of the label "204" is "horizontal screen identification", the eighth input can include an operation of clicking "horizontal screen identification", a pull-down menu is displayed in response to the operation, the pull-down menu includes "horizontal screen identification" and "vertical screen identification". The eighth input further includes an operation of clicking "vertical screen identification", as shown in FIG. 7. in response to the eighth input, the "horizontal screen identification" is updated to the "vertical screen identification" indicated by the label "205", the display mode of the live streaming interface is switched from the horizontal screen mode to the vertical screen mode, so that it is possible to prevent switching of the screen display mode due to a wrong operation.

In the embodiment of the disclosure, the identification area comprises the horizontal and vertical screen identification, and a user can rapidly switch horizontal and vertical screen display through the operation of switching the identification of the horizontal and vertical screen, so that the operation efficiency can be improved.

In some embodiments, in a case that the display area required by the at least one scene identification is larger than a first area, the first area includes a scroll control, and the first area is an area available for displaying the scene identification in the identification area. The live streaming interface display method provided by the embodiment of the present disclosure can further include the following steps 114 to 115.

114. The electronic apparatus receives a fifth input.

Wherein the fifth input is for controlling movement of the scroll control.

In some embodiments, the fifth input can be a scroll input in the first area (which can be a scroll input implemented by a mouse after a cursor is positioned in the first area), a slide input in the first area, a drag input on the scroll control, a click input in an area where the scroll control is located, or other feasibility inputs, which is not limited in the embodiment of the present disclosure.

For example, the detailed description of the click input and the slide input can refer to the related description of the click input and the slide input in the description of the first input in step 102, and will not be described herein again. The scroll input can be an upward scroll input or a downward scroll input; the drag input can be an upward drag input or a downward drag input, and the embodiment of the present disclosure is not limited.

115. The electronic apparatus, in response to a fifth input, updates the scene identification which is currently visible for the user in the first area along with the movement of the scroll control.

It will be appreciated that the scene identities that are currently visible to the user are all the scene identities that the user can see without any operation of the first area. When the number of the at least one scene identification exceeds the number of the scene identifications that can be displayed in the first area, only apart of the at least one scene identification (the part of the scene identification that can be seen by the user, that is, the scene identification that can be seen by the user) can be seen by the user, and another part of the scene identification cannot be seen by the user.

Wherein, in response to the fifth input, the scene identification currently visible to the user in the first area is updated along with the movement of the scroll control, and it is understood that the scene identification in the first area can support the scroll display along with the operation of the user.

In the embodiment of the present disclosure, when the number of the at least one scene identification exceeds the number of the scene identifications that can be displayed in the first area, the scene identification in the first area can support scrolling display along with the operation of the user. Therefore, the scene identification required by the user can be conveniently and quickly found, and the operation efficiency is improved.

In some embodiments, after step 103, the live streaming interface display method provided by the embodiments of the present disclosure can further include steps 116 to 117 described below.

116. The electronic apparatus receives a sixth input for adding the data source identification.

It will be appreciated that the sixth input is an operation for adding new data source. In some embodiments, the sixth input can be a click input to add the data source identification, a slide input to add the data source identification, or other feasible inputs to add the data source identification, which is not limited in the embodiments of the present disclosure.

For example, the detailed description of the click input and the slide input can refer to the related description of the click input and the slide input in the description of the first input in step 102, and will not be described herein again.

The add data source identification is displayed in the identification area. For example, if a new data source is added in the first live streaming scene, the add data source identification can be after the identification displaying the at least one first data source identification. That is, each scene identification corresponds to one add data source identification. The common add data source identification for all scene identifications can also be displayed in the identification area, and the add data source identification can be operated for each scene identification. The add data source identification can also be displayed in other positions in the identification area, which is not limited in the embodiment of the present disclosure.

117. The electronic apparatus, in response to the sixth input, displays a third data source identification corresponding to the newly added third data source in a second area of the identification area, and displays the third data source in the first live streaming scene.

The second area is used for displaying the data source identification corresponding to the first scene identification.

It can be understood that, through a sixth input on the addition data source identification, the electronic apparatus can be triggered to add a new data source, and display a third data source identification corresponding to the newly added data source in the second area, and display the newly added third data source in the first live streaming scene.

Figure 9:
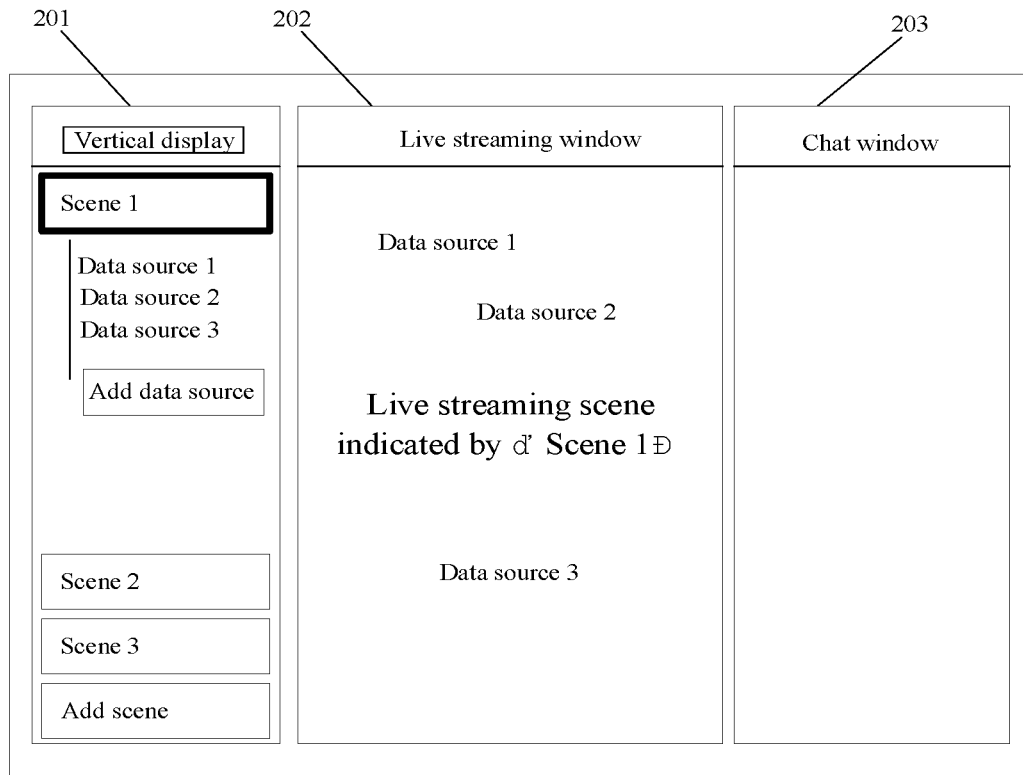
FIG. 9 is an eighth schematic interface diagram of a live streaming interface display method according to an embodiment of the present disclosure.

For example, as shown in FIG. 3, the identification area displays "Add data source", the user clicks "Add data source", and as shown in FIG. 9, the electronic apparatus displays "Data Source 3" that is newly added in the identification area.

In the embodiment of the disclosure, the add data source identification is displayed in the identification area, the operation is simple and convenient, a new data source can be added quickly, the user does not need to perform multiple operations to add the new data source, and the operation efficiency can be improved.

In some embodiments, the step 117 can be specifically realized by the following steps 117a to 117b.

117a. The electronic apparatus displays the first list in response to the sixth input.

The first list comprises at least one data source type identification, and each data source type identification is used for indicating one type of data source.

The first list can be a data source type identification menu, the first list can be displayed in a suspended manner on the identification area, or can be displayed (in an embedded manner) in the identification area (that is, apart of the identification area), and the embodiments of the present disclosure are not limited thereto.

117b. The electronic apparatus displays a third data source identification in the second area in response to the input on the first data source type identification in the at least one data source type identification.

The third data source is the data source of the type indicated by the first data source type identification.

It is understood that, in the embodiment of the present disclosure, the electronic apparatus can be triggered to display at least one data source type identification by a sixth input for adding a data source identification, so that the user can select a type of a data source that needs to be added. Then, the electronic apparatus can be triggered to add (corresponding to the first data source type identification) a third data source of a corresponding type through inputting the first data source type identification required by the user.

Figure 10:
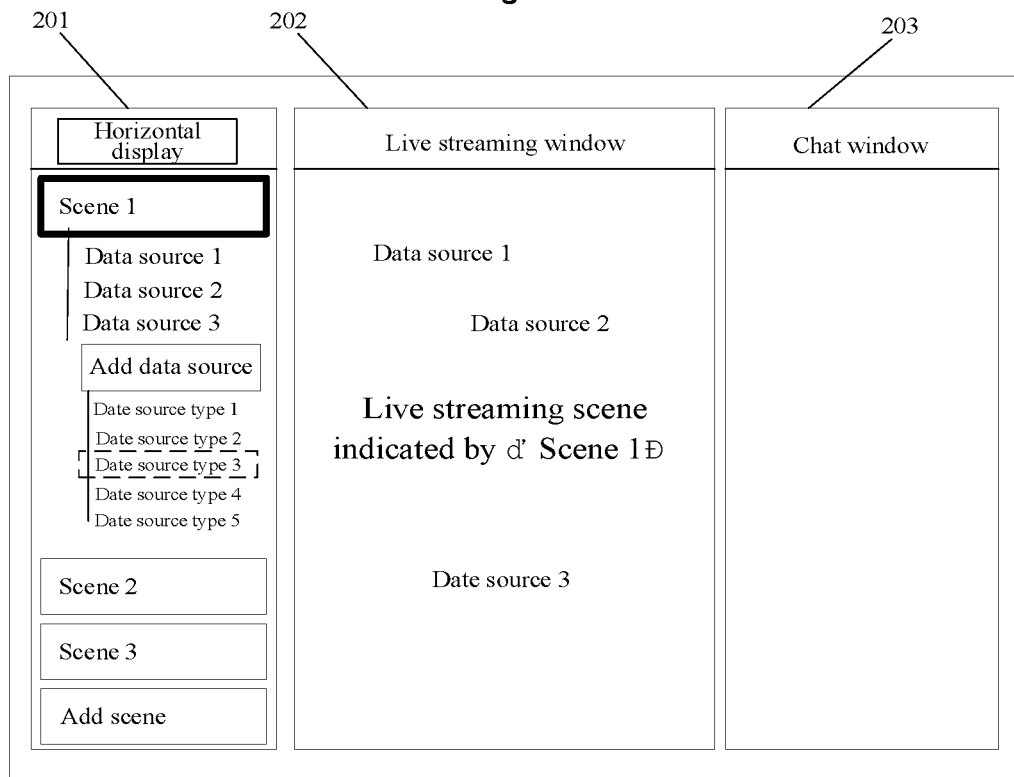
FIG. 10 is a ninth schematic interface diagram of a live streaming interface display method according to an embodiment of the present disclosure.

For example, as shown in FIG. 3, the identification area displays "Add data source", the user clicks "Add data source". As shown in FIG. 10, the electronic apparatus displays data source types that can be added, such as "Data source type 1", "Data source type 2", "Data source type 3", "Data source type 4", "Data source type 5", the user selects "Data source type 3". As shown in FIG. 10, the electronic apparatus displays "Data source 3" newly added in the identification area, and displays data source 3 in the live streaming scene indicated by "Scene 1".

In the embodiment of the disclosure, the first list is displayed, and a plurality of selectable data source types are provided for a user, so that a data source of a required type can be added quickly, and the operation efficiency is improved.

In some embodiments, after the step 103, the live streaming interface display method provided by the embodiment of the present disclosure can further include the following steps 118 to 119.

118. The electronic apparatus receives a seventh input on a fourth data source identification of the at least one first data source identification.

In some embodiments, the seventh input can be a click input on the fourth data source identification, a slide input on the fourth data source identification, a drag input on the fourth data source identification, or other feasible inputs to the fourth data source identification, which is not limited in the embodiment of the present disclosure.

For example, the detailed description of the click input and the slide input can refer to the related description of the click input and the slide input in the description of the first input in step 102, and will not be described herein again. The drag input can be a drag input in any direction, for example, an upward drag input, a downward drag input, a leftward drag input, or a rightward drag input, and the embodiment of the present disclosure is not limited.

119. The electronic apparatus performs the target operation in response to the seventh input.

Wherein the target operation comprises any one of: operating a fourth data source (Action), renaming the fourth data source (Rename), modifying the background of the fourth data source (Setting), locking the fourth data source (Lock), unlocking the fourth data source (Unlock), deleting the fourth data source (Delete), moving the fourth data source (Move), moving the fourth data source forward by one position (Bring forward), moving the fourth data source to the frontmost position (Bringing to front), moving the fourth data source backward by one position (Send backward), moving the fourth data source to the last position (Send to back), and moving the fourth data source identification.

The target operation can specifically determine which operation is according to a user requirement, and the embodiment of the present disclosure is not limited.

Renaming the fourth data source means modifying the fourth data source identification.

When the seventh input is an input dragging the fourth data source identification, the position of the fourth data source identification in the at least one first data source identification can be changed.

Figure 11:
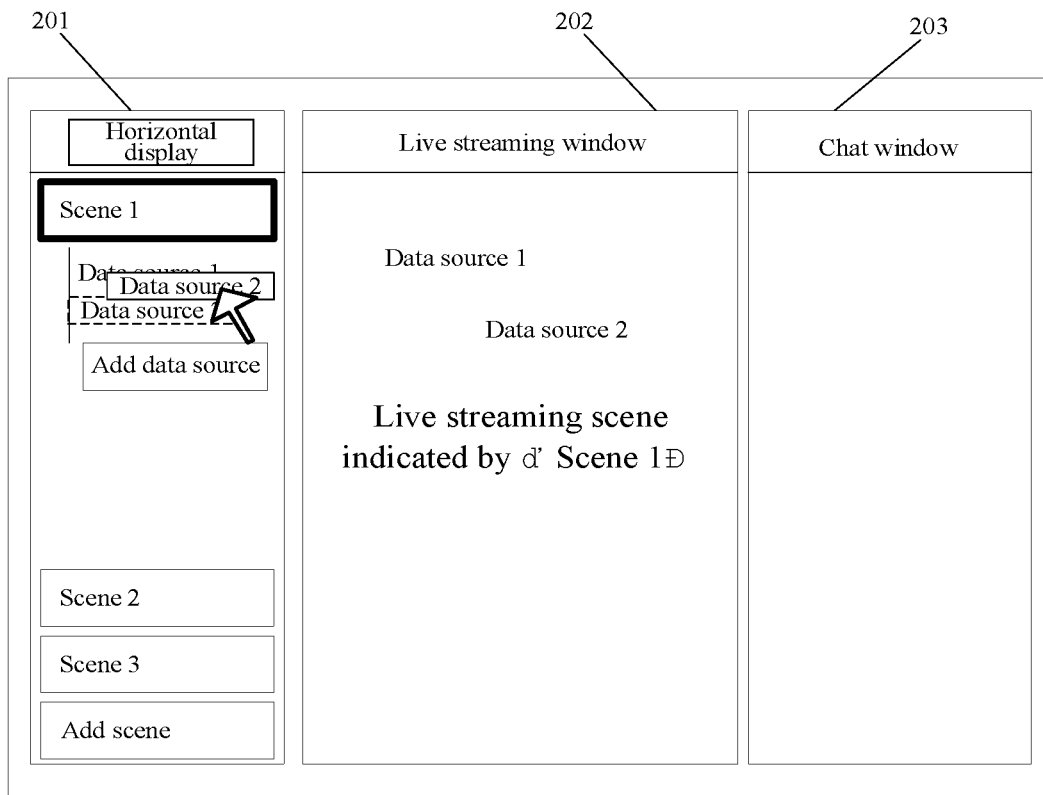
FIG. 11 is a tenth schematic interface diagram of a live streaming interface display method according to an embodiment of the present disclosure.

For example, as shown in FIG. 11, the position of the "Data source 2" can be moved by dragging the "Data source 2".

In the embodiment of the present disclosure, by the seventh input on the fourth data source identification, the fourth data source can be quickly operated, and the operation efficiency can be improved.

In some embodiments, the step 119 can be specifically realized by the following steps 119a to 119b.

119a. The electronic apparatus displays the second list.

The second list includes at least one operation identification, and each operation identification is used for indicating an operation.

The second list can be an operation menu of the data source, the second list can be displayed in a suspended manner on the identification area, or can be displayed (in an embedded manner) in the identification area (that is, a part of the identification area), and the embodiments of the present disclosure are not limited thereto.

119b. The electronic apparatus, in response to the input on the target operation identification in the at least one operation identification, executes the target operation.

Wherein the target operation identification is used for indicating the target operation.

It is understood that, in the embodiment of the present disclosure, the electronic apparatus can be triggered to display at least one operation identification through a seventh input on the fourth data source identification, so that the user can select a desired operation. Then, the electronic apparatus can be triggered to execute the target operation corresponding to the target operation identification through the input on the target operation identification.

Figure 12:
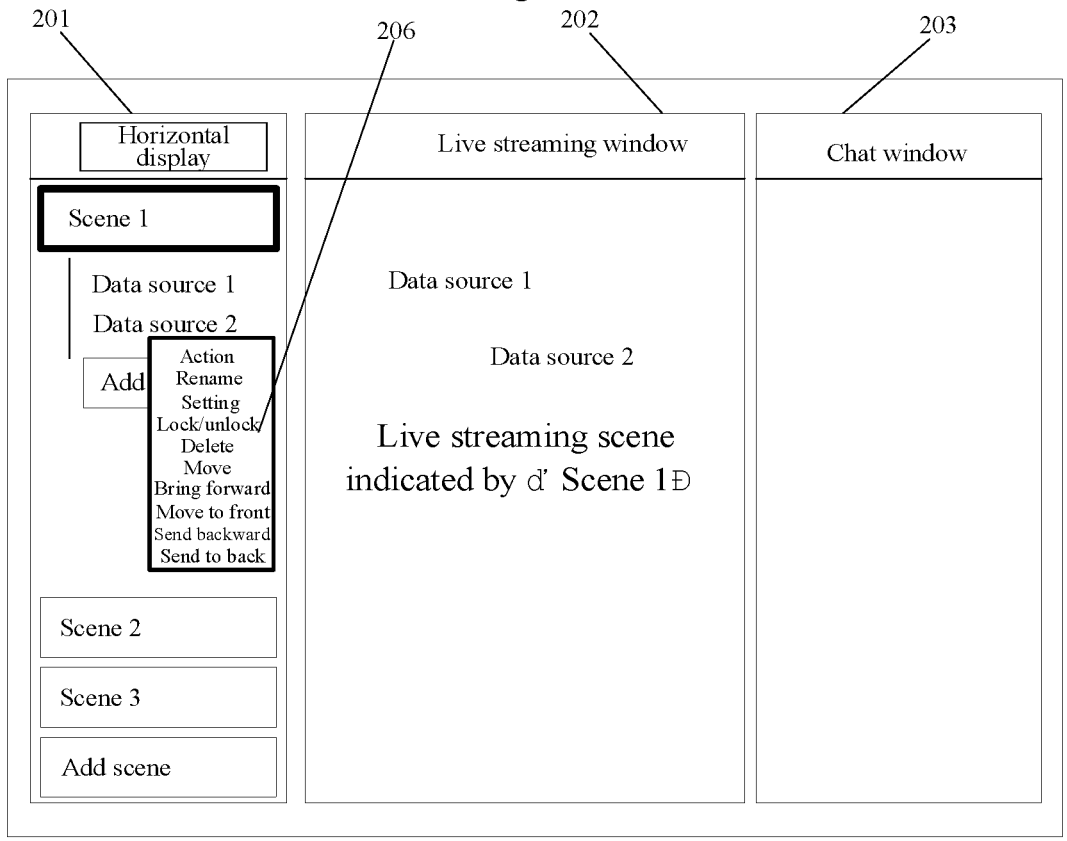
FIG. 12 is an eleventh schematic interface diagram of a live streaming interface display method according to an embodiment of the present disclosure.

For example, as shown in FIG. 3, the user presses "Data source 2" for a long time. As shown in FIG. 12, the electronic apparatus displays a first list indicated by the label "206", the first list including: "Action", "Rename", "Setting", "Lock/unlock", "Delete", "Bring forward", "Bring to front", "Send backward", and "Send to back". The user selects any identification in the first list and the electronic apparatus controls the data source 2 to perform the corresponding operation.

In the embodiment of the present disclosure, displaying the first list can facilitate a user to select an operation identification corresponding to a required operation, so as to execute a corresponding operation on the fourth data source, and can improve operation efficiency.

In some embodiments, after step 103, the live streaming interface display method provided by the embodiments of the present disclosure can further include steps 120 to 121 described below.

120. The electronic apparatus receives a fourth input in a case where the chat window is displayed on the live streaming interface.

121. The electronic apparatus, in response to a fourth input by the electronic apparatus, and if the fourth input is the operation on the streaming state identification in the chat window, displays the current streaming state; and if the fourth input is the operation on the window locking identification in the chat window, displays the chat window in a locking state.

In a case where the chat window is suspended on the live streaming window area and is in a locked state, the electronic apparatus responds to the operation on the data source in the live streaming window area below the chat window.

In some embodiments, the fourth input can be a click input on the streaming state identification or the window lock identification, a slide input on the streaming state identification or the window lock identification, or other feasibility inputs to the streaming state identification or the window lock identification, which is not limited in the embodiments of the present disclosure.

For example, the detailed description of the click input and the slide input can refer to the related description of the click input and the slide input in the description of the first input in step 102, and will not be described herein again.

The streaming state identification can be a controllable control, and the window locking identification can also be a controllable control, which is not limited in the embodiment of the present disclosure. The chat window can be displayed in the live streaming interface in an embedded manner, or can be displayed on the live streaming interface in a suspended manner, which is not limited in the embodiment of the present disclosure.

It can be understood that, if the fourth input is an operation on the streaming state identification, the electronic apparatus, in response to the fourth input, displays the current streaming state; and if the fourth input is the operation on the window locking identification, the electronic apparatus, in response to the fourth input, displays the chat window in a locking state.

Wherein the current streaming state can include at least one of: central Processing Unit (CPU) occupation information, Memory occupation information, upload speed (Kbps upload), slow frames (Slow Frames), frame dropping (Frame Drops), and frame transmission per second (Frames Per Second, FPS) of an encoder (Encoder); other information can also be reported in the current streaming state, and the embodiment of the present disclosure is not limited.

Figure 13:
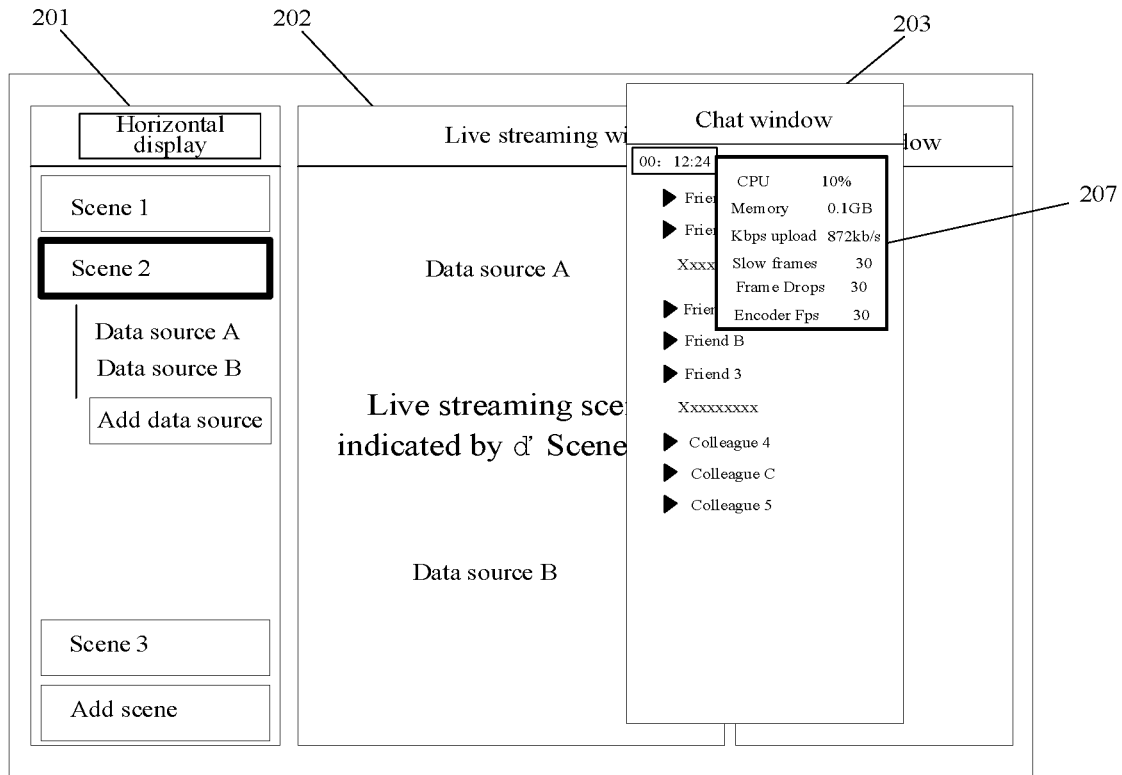
FIG. 13 is a twelfth schematic interface diagram of a live streaming interface display method according to an embodiment of the present disclosure.

For example, as shown in FIG. 13, the user clicks the "streaming state identification" indicated by the label "207" to display the current streaming state, such as the streaming state displayed in the floating window indicated by the label "208".

After the chat window in the locked state is displayed, except that the window locking identification in the chat window can be operated, other contents cannot be operated, that is, the user inputs other contents, and the electronic apparatus prohibits the response to the input of other contents.

In some embodiments, after displaying the chat window in the locked state, the electronic apparatus can respond to operation of content below the chat window through the chat window. For example, in the case where the chat window is suspended over the live streaming window area and the chat window is in a locked state, the electronic apparatus responds to operation of a data source in the live streaming window area below the chat window. Therefore, the data source in the live streaming window area can be conveniently and timely controlled by a user in case of emergency, and the operation efficiency can be improved.

By the live streaming interface display method provided by the embodiment of the disclosure, the interactive operation process in the live streaming software can be simplified, the operation of a user (such as an anchor) is facilitated, and the human-computer interaction performance of the live streaming software can be improved.

Figure 14:
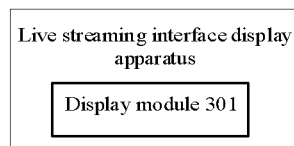
FIG. 14 is a block diagram of a structure of a live streaming interface display apparatus according to an embodiment of the present disclosure.

FIG. 14 is a block diagram of a structure of a live streaming interface display apparatus according to an embodiment of the present disclosure, as shown in FIG. 14, including: a display module 301, the display module 301 is configured to display a live streaming interface, the live streaming interface comprises an identification area, the identification area comprises at least one scene identification, and each scene identification is used for indicating a live streaming scene, the display module 301 is further configured to in response to a first input on a first scene identification of the at least one scene identification, display at least one first data source identification corresponding to the first scene identification in the identification area, wherein the first scene identification is configured to indicate a first live streaming scene, and each first data source identification is used for indicating one data source in the first live streaming scene.

In some embodiments, the live streaming interface further comprises a live streaming window area, and the device also includes: a receiving module; the display module 301 is further configured to, after displaying the live streaming interface, in response to the first input, display the first live streaming scene in the live streaming window area; the receiving module is configured to receive a second input on a second scene identification of the at least one scene identification; the display module 301 is configured to in response to the second input, update the first live streaming scene displayed by the live streaming window area to a second live streaming scene indicated by the second scene identification.

In some embodiments, the first scene identification is in a selected state after the first input; the device also includes: a switching module; the switching module is configured to in response to the second input, switch the first scene identification from the selected state to an unselected state, and switch the second scene identification from the unselected state to the selected state.

In some embodiments, the first scene identification is in a selected state after the first input; the display module 301 is further configured to in response to the second input, cancel display of the at least one first data source identification; and in the identification area, display at least one second data source identification corresponding to the second scene identification, wherein each second data source identification is used for indicating one data source in the second live streaming scene.

In some embodiments, the at least one scene identification is arranged in sequence in a preset order; and the display module 301 is further configured to in response to the first input, display the at least one scene identification respectively in different display areas by taking the first scene identification as a boundary, and the first scene identification and scene identifications arranged before the first scene identification are displayed in the same display area; the device also includes: a moving module; the moving module is configured to in response to a second input, move target identification from a current display area to another display area; wherein: if a second scene identification is arranged before the first scene identification, the target identification comprises the first scene identification and a scene identification arranged after the second scene identification and before the first scene identification; and if the second scene identification is arranged after the first scene identification, the target identification includes the second scene identification and a scene identification arranged after the first scene identification and arranged before the second scene identification.

In some embodiments, the identification area includes an added scene identification, and the device also includes: a receiving module, the receiving module is configured to after the display module 301 displays the live streaming interface, receive a third input on the adding scene identification; the display module 301 is further configured to in response to the third input received by the receiving module, display a third scene identification corresponding to a newly added live streaming scene in the identification area; and display the newly added live streaming scene in the live streaming window area.

In some embodiments, the apparatus further comprises: a receiving module, the receiving module is configured to receive a fourth input in a case where a chat window is displayed on the live streaming interface by the display module 301; the display module 301 is further configured to in response to the fourth input received by the receiving module, if the fourth input is an operation on a streaming state identification in the chat window, display a current streaming state; if the fourth input is an operation on a window locking identification in the chat window, display the chat window in a locking state; and in a case where the chat window is suspended on the live streaming window area and is in the locked state, respond to an operation of the data source in the live streaming window area below the chat window.

In some embodiments, in a case where a display area required for the at least one scene identification is larger than the first area, the first area includes a scroll control, the first area being an area for displaying the scene identification in the identification area; the device also includes: a receiving module; the receiving module is configured to receive a fifth input for controlling movement of the scroll control; the display module 301 is further configured to in response to the fifth input received by the receiving module, update scene identification currently visible to an user in the first region as the scroll control moves.

In some embodiments, the apparatus further comprises: a receiving module; the receiving module is configured to after the display module 301 displays the at least one first data source identification corresponding to the first scene identification in the identification area, receive a sixth input for adding a data source identification; the display module 301 is further configured to in response to the sixth input received by the receiving module, display a third data source identification corresponding to a newly added third data source in a second area of the identification area, wherein the second area is configured to display a data source identification corresponding to the first scene identification; and display the third data source in the first live streaming scene.

In some embodiments, the display module 301 is specifically configured to in response to the sixth input, display a first list, wherein the first list includes at least one data source type identification, and each data source type identification is used to indicate a type of a data source; in response to an input on a first data source type identification in the at least one data source type identification, display a third data source identification in a second area; and the third data source is the data source of the type indicated by the first data source type identification.

In some embodiments, the device further comprises a receiving module and an executing module; the receiving module is configured to after the display module 301 displays the at least one first data source identification corresponding to the first scene identification in the identification area, receive a seventh input on a fourth data source identification of the at least one first data source identification; the execution module is configured to in response to the seventh input received by the receiving module, perform a target operation, the target operation comprising any one of: operating the fourth data source, renaming the fourth data source, modifying a context of the fourth data source, locking the fourth data source, unlocking the fourth data source, deleting the fourth data source, moving the fourth data source identification one position forward, moving the fourth data source identification to the front, moving the fourth data source identification one position backward, and moving the fourth data source identification to the end.

In some embodiments, the execution module is specifically configured to display a second list, wherein the second list includes at least one operation identification, and each operation identification is used for indicating an operation; in response to an input on a target operation identification in the at least one operation identification, perform the target operation; wherein the target operation identification is used for indicating the target operation.

In some embodiments, the identification area further comprises a first identification, the first identification is used for indicating a first screen mode, the first screen mode is a horizontal screen display mode or a vertical screen display mode, and the first screen mode is a current display mode of the live streaming interface; the device also includes: a receiving module; the receiving module is configured to, after the display module 301 displays the live streaming interface, receive an eighth input on the first identification; the display module 301 is further configured to in response to the eighth input received by the receiving module, update the first identification to a second identification, and switch the display mode of the live streaming interface from the first screen mode to a second screen mode; the second identification is configured to indicate the second screen mode, the second screen mode is the horizontal screen display mode or the vertical screen display mode, and the second screen mode is different from the first screen mode.

In the embodiment of the present disclosure, each module can implement the live streaming interface display method provided in the above method embodiment, and can achieve the same technical effect, and in order to avoid repetition, the details are not repeated here.

Figure 15:
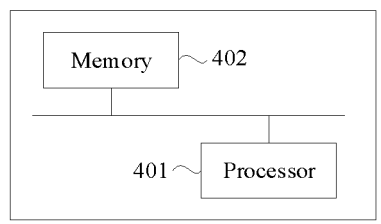
FIG. 15 is a block diagram of an electronic apparatus according to an embodiment of the present disclosure.

An embodiment of the present disclosure further provides an electronic apparatus, as shown in FIG. 15, the electronic apparatus can include: the processor 401, the memory 402, and the computer program stored in the memory 402 and capable of running on the processor 401, where the computer program, when executed by the processor, can implement each process of the live streaming interface display method provided in the foregoing method embodiment, and can achieve the same technical effect, and in order to avoid repetition, details are not repeated here.

The embodiment of the present disclosure provides a computer-readable storage medium, where a computer program is stored on the computer-readable storage medium, and when the computer program is executed by a processor, the computer program implements each process of the live streaming interface display method provided in the foregoing method embodiment, and can achieve the same technical effect, and in order to avoid repetition, details are not repeated here.

The embodiments of the present disclosure further provide a computer program product, where the computer program product includes a computer program, and when the computer program product runs on a processor, the processor is enabled to execute the computer program, so as to implement each process of the live streaming interface display method provided in the foregoing method embodiments, and achieve the same technical effect, and in order to avoid repetition, details are not repeated here.

The embodiment of the present disclosure further provides a chip, where the chip includes a processor and a communication interface, the communication interface is coupled to the processor, and the processor is configured to run a program or an instruction to implement each process of the above live streaming interface display method embodiment, and can achieve the same technical effect, and in order to avoid repetition, the description is omitted here.

It should be understood that the chips mentioned in the embodiments of the present disclosure can also be referred to as a system-level-chip, a system chip, a chip system or a system-on-chip and so forth.

The present disclosure provides a computer program comprising: instructions that when executed by a processor cause the processor to perform a live streaming interface display method according to any one of the embodiments.

In the several embodiments provided in the present disclosure, it should be understood that the disclosed system, apparatus, server and method can be implemented in other ways. For example, the above-described apparatus embodiments are merely illustrative, and for example, the division of the units is only one type of logical functional division, and other divisions can be realized in practice, for example, multiple units or components can be combined or integrated into another system, or some features can be omitted, or not executed. In addition, the shown or discussed mutual coupling or direct coupling or communication connection can be an indirect coupling or communication connection through some interfaces, devices or units, and can be in an electrical, mechanical or other form.

The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present disclosure can be integrated into one processing unit, or each unit can exist alone physically, or two or more units are integrated into one unit. The integrated unit can be implemented in the form of hardware, or can also be implemented in the form of a software functional unit.

The integrated unit, if implemented in the form of a software functional unit and sold or used as a stand-alone product, can be stored in a computer readable storage medium. Based on such understanding, the technical solutions of the present disclosure can be embodied in the form of a software product, which is stored in a storage medium and includes several instructions for causing a computer device (which can be a personal computer, a server, or a network device) to execute all or part of the steps of the methods according to the embodiments of the present disclosure. And the aforementioned storage medium includes: a U-disk, a removable hard disk, a Read-Only Memory (ROM), a Random Access Memory (RAM), a magnetic disk, or an optical disk, and various media capable of storing program codes.

The above embodiments are only used to illustrate the technical solutions of the present disclosure, and not to limit the same; although the present disclosure has been described in detail with reference to the foregoing embodiments, it should be understood by those of ordinary skill in the art that: the technical solutions described in the foregoing embodiments can still be modified, or some technical features can be equivalently replaced; such modifications and substitutions do not depart from the spirit and scope of the technical solutions of the embodiments of the present disclosure.

What is claimed is:

1. A live streaming interface display method comprising:
   displaying a live streaming interface, wherein the live streaming interface comprises an identification area, the identification area comprises a plurality of scene identifications, and each scene identification is configured to indicate a live streaming scene; and
   in response to a first input on a first scene identification of scene identifications, displaying at least one first data source identification corresponding to the first scene identification in the identification area, wherein the first scene identification is configured to indicate a first live streaming scene, and each first data source identification is configured to indicate one data source in the first live streaming scene,
   receiving a second input on a second scene identification of scene identifications;
   in response to the second input, canceling display of the at least one first data source identification; and
   in the identification area, displaying at least one second data source identification corresponding to the second scene identification, wherein each second data source identification is configured to indicating one data source in the second live streaming scene.

2. The live streaming interface display method of claim 1, wherein the live streaming interface further comprises a live streaming window area, and
   the live streaming interface display method further comprises:
   in response to the first input, displaying the first live streaming scene in the live streaming window area; and
   in response to the second input, updating the first live streaming scene displayed by the live streaming window area to a second live streaming scene indicated by the second scene identification.

3. The live streaming interface display method of claim 2, wherein the first scene identification is in a selected state after the first input, and
   the live streaming interface display method further comprises:
   in response to the second input, switching the first scene identification from the selected state to an unselected state, and switching the second scene identification from the unselected state to the selected state.

4. The live streaming interface display method of claim 1, wherein the scene identifications are arranged in sequence in a preset order, and
   the live streaming interface display method further comprises:
   in response to the first input, displaying the scene identifications respectively in different display areas by taking the first scene identification as a boundary, and the first scene identification and scene identifications arranged before the first scene identification are displayed in one display area; and
   in response to a second input, moving target identification from a current display area to another display area;
   wherein:
   if a second scene identification is arranged before the first scene identification, the target identification comprises the first scene identification and scene identifications arranged after the second scene identification and before the first scene identification; and
   if the second scene identification is arranged after the first scene identification, the target identification includes the second scene identification and scene identifications arranged after the first scene identification and arranged before the second scene identification.

5. The live streaming interface display method of claim 2, wherein the identification area includes an added scene identification, and the live streaming interface display method further comprises:

receiving a third input on the added scene identification;

in response to the third input, displaying a third scene identification corresponding to a newly added live streaming scene in the identification area; and displaying the newly added live streaming scene in the live streaming window area.

6. The live streaming interface display method of claim 2, further comprising:

receiving a fourth input in a case where a chat window is displayed on the live streaming interface;

in response to the fourth input, if the fourth input is an operation on a streaming state identification in the chat window, displaying a current streaming state; if the fourth input is an operation on a window locking identification in the chat window, displaying the chat window in a locking state; and in a case where the chat window is suspended on the live streaming window area and is in the locking state, responding to an operation of the data source in the live streaming window area below the chat window.

7. The live streaming interface display method of claim 1, wherein the identification area includes a first area and in a case where a display area required for the plurality of scene identifications is larger than the first area, the first area includes a scroll control, the first area being an area for displaying the scene identifications in the identification area, and the live streaming interface display method further comprises:

receiving a fifth input for controlling movement of the scroll control; and in response to the fifth input, updating scene identification currently visible to a user in the first area as the scroll control moves.

8. The live streaming interface display method of claim 1, wherein after displaying the at least one first data source identification corresponding to the first scene identification in the identification area, the method further comprises:

receiving a sixth input for adding a data source identification;

in response to the sixth input, displaying a third data source identification corresponding to a newly added third data source in a second area of the identification area, wherein the second area is configured to display a data source identification corresponding to the first scene identification; and displaying the third data source in the first live streaming scene.

9. The live streaming interface display method of claim 8, wherein the in response to the sixth input, displaying a third data source identification corresponding to a newly added third data source in a second area of the identification area comprises:

in response to the sixth input, displaying a first list, wherein the first list includes at least one data source type identification, and each data source type identification is configured to indicate a type of a data source; and in response to an input on a first data source type identification in data source type identifications, displaying a third data source identification in a second area; and the third data source is the data source of the type indicated by the first data source type identification.

10. The live streaming interface display method of claim 1, wherein after displaying the at least one first data source identification corresponding to the first scene identification in the identification area, the method further comprises:

receiving a seventh input on a fourth data source identification of the at least one first data source identification; and in response to the seventh input, performing a target operation, the target operation comprising any one of: operating the fourth data source, renaming the fourth data source, modifying a context of the fourth data source, locking the fourth data source, unlocking the fourth data source, deleting the fourth data source, moving the fourth data source identification one position forward, moving the fourth data source identification to front, moving the fourth data source identification one position backward, and moving the fourth data source identification to back.

11. The live streaming interface display method of claim 10, wherein the in response to the seventh input, performing a target operation comprises:

displaying a second list, wherein the second list includes at least one operation identification, and each operation identification is configured to indicate an operation; and in response to an input on a target operation identification in the operation identifications, performing the target operation; wherein the target operation identification is configured to indicate the target operation.

12. The live streaming interface display method of claim 1, wherein the identification area further comprises a first identification, the first identification is configured to indicate a first screen mode, the first screen mode is a horizontal screen display mode or a vertical screen display mode, and the first screen mode is a current display mode of the live streaming interface; and the method further comprises:

receiving an eighth input on the first identification; in response to the eighth input, updating the first identification to a second identification, and switching the display mode of the live streaming interface from the first screen mode to a second screen mode; wherein the second identification is configured to indicate the second screen mode, the second screen mode is the horizontal screen display mode or the vertical screen display mode, and the second screen mode is different from the first screen mode.

13. An electronic apparatus, comprising: a memory and a processor; the memory is configured to store a computer program and when the computer program is invoked, the processor is configured to:

display a live streaming interface, wherein the live streaming interface comprises an identification area, the identification area comprises a plurality of scene identifications, and each scene identification is configured to indicate a live streaming scene;

in response to a first input on a first scene identification of the scene identifications, display at least one first data source identification corresponding to the first scene identification in the identification area, wherein the first scene identification is configured to indicate a first live streaming scene, and each first data source identification is configured to indicate one data source in the first live streaming scene;

receive a second input on a second scene identification of scene identifications;

in response to the second input, cancel display of the at least one first data source identification; and in the identification area, display at least one second data source identification corresponding to the second scene identification, wherein each second data source identification is configured to indicating one data source in the second live streaming scene.

14. A non-transitory computer-readable storage medium having stored thereon a computer program which, when executed by a processor, performs the following steps:

display a live streaming interface, wherein the live streaming interface comprises an identification area, the identification area comprises a plurality of scene identifications, and each scene identification is configured to indicate a live streaming scene;

in response to a first input on a first scene identification of scene identifications, display at least one first data source identification corresponding to the first scene identification in the identification area, wherein the first scene identification is configured to indicate a first live streaming scene, and each first data source identification is configured to indicate one data source in the first live streaming scene;

receive a second input on a second scene identification of scene identifications;

in response to the second input, cancel display of the at least one first data source identification; and in the identification area, display at least one second data source identification corresponding to the second scene identification, wherein each second data source identification is configured to indicating one data source in the second live streaming scene.

\* \* \* \* \*